(12) United States Patent
Tsai et al.

(10) Patent No.: US 10,788,607 B2
(45) Date of Patent: Sep. 29, 2020

(54) FRESNEL LENS WITH A LIGHT RECEIVING EFFECT

(71) Applicant: CONCRAFT HOLDING CO., LTD., Grand Cayman (KY)

(72) Inventors: Tzu-Ching Tsai, New Taipei (TW); Jie-Ru Chen, New Taipei (TW)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 141 days.

(21) Appl. No.: 16/053,057

(22) Filed: Aug. 2, 2018

(65) Prior Publication Data
US 2019/0302323 A1    Oct. 3, 2019

(30) Foreign Application Priority Data

Apr. 3, 2018   (TW) ............................ 107111716 A

(51) Int. Cl.
*G02B 3/08* (2006.01)
*B29D 11/00* (2006.01)
*B29K 105/00* (2006.01)

(52) U.S. Cl.
CPC .......... *G02B 3/08* (2013.01); *B29D 11/00269* (2013.01); *B29K 2105/0061* (2013.01)

(58) Field of Classification Search
CPC ................. G02B 3/08; B29D 11/00269; B29K 2105/0061

USPC .......................................................... 359/742
See application file for complete search history.

(56) References Cited

U.S. PATENT DOCUMENTS

| 5,404,869 A * | 4/1995 | Parkyn, Jr. ............... F24S 23/31 126/699 |
| 6,407,859 B1 * | 6/2002 | Hennen ................ G03B 21/625 359/454 |
| 2018/0231778 A1 * | 8/2018 | Yoon .................. G02B 27/0172 |

* cited by examiner

*Primary Examiner* — Mohammed A Hasan
(74) *Attorney, Agent, or Firm* — Muncy, Geissler, Olds & Lowe, P.C.

(57) ABSTRACT

The present invention discloses a Fresnel lens with a light receiving effect, including a converging surface and an incidence surface opposite to the converging surface. The incidence surface is provided with an optically effective refractive region and an optically reflective region annularly surrounding the optically effective refractive region. The optically reflective region is provided at least with a prism annularly disposed outside the optically effective refractive region. The prism is provided with a refraction surface which is in adjacent to the optically effective refractive region and a reflection surface which is disposed at a first angle relative to the refraction surface. In addition, a tail end of the prism is an inverted hook part. Therefore, the effective working area of the refraction surface and the reflection surface can be increased, thereby improving the light receiving effect of the Fresnel lens.

10 Claims, 3 Drawing Sheets

FRESNEL LENS WITH A LIGHT RECEIVING EFFECT

BACKGROUND OF THE INVENTION a) Field of the Invention

The present invention relates to a Fresnel lens, and more particularly to a Fresnel lens with a light receiving effect.

b) Description of the Prior Art

A Fresnel lens is characterized in a short focus, high luminous flux and light in weight. In addition, the application of Fresnel lens is very wide; in particular, the Fresnel lenses are largely used on flashlights in existing smartphones to increase the projected angles of light of the flashlights.

The Fresnel lens applied on the flashlight of the existing smartphone is primarily formed by injection molding to a plastic material, and the Fresnel lens includes a converging surface and an incidence surface. The incidence surface is provided with an optically effective refractive region and at least an optically reflective region surrounding the optically effective refractive region. The optically reflective region includes a first prism that is annularly disposed outside the optically effective refractive region and a second prism that is annularly disposed outside the first prism. The first prism and the second prism are arranged concentrically, and the first prism is provided with a first refraction surface in adjacent to the optically effective refractive region and a first reflection surface that is disposed at a first angle relative to the first refraction surface; whereas, the second prism is provided with a second refraction surface that is connected with the first reflection surface and is disposed at a second angle relative to the first reflection surface, as well as a second reflection surface that is disposed at a third angle relative to the second refraction surface, with a first lead angle portion being connected between the first reflection surface and the second refraction surface.

However, the conventional Fresnel lens is formed integrally by heating up a plastic material into liquid that is then injected into a mold, followed by being cooled down in the mold. Therefore, when the first lead angle portion is formed in the plastic material, in addition to that the plastic material will be affected by the contraction in the cooling process, the plastic material will not be completely filled into the mold in the process of injection, due to the bad fluidity of the plastic material itself, thereby resulting in that the radius of the first lead angle portion is too large. It is found from an actual measurement to the conventional Fresnel lens that the radius of the first lead angle portion is roughly between 0.02 mm and 0.025 mm, which in turn limits the effective working area of the first reflection surface and the second refraction surface, thereby affecting the light receiving effect of the Fresnel lens.

Accordingly, how to provide a Fresnel lens to increase the reflection area, the refraction area and the overall light receiving effect is the technical means and the object thereof to be solved by the present invention.

SUMMARY OF THE INVENTION

The primary object of the present invention is to provide a Fresnel lens, and more particularly to a Fresnel lens wherein the reflection area and the refraction area are increased to improve the overall light receiving effect.

To achieve the abovementioned object, the present invention discloses a Fresnel lens with a light receiving effect. The Fresnel lens comprises a converging surface and an incidence surface opposite to the converging surface. The incidence surface is provided with an optically effective refractive region and an optically reflective region surrounding the optically effective refractive region. The optically reflective region is provided at least with a prism that is annularly disposed outside the optically effective refractive region. The prism is provided with a refraction surface in adjacent to the optically effective refractive region and a reflection surface that is disposed at a first angle relative to the refraction surface. The refraction surface is provided with a first bending section that is extended toward the optically effective refractive region, the reflection surface is provided with a second bending section that is extended toward the optically effective refractive region, and the first bending section is interconnected with the second bending section, so that an inverted hook portion is formed on a tail end of the prism using the first bending section and the second bending section, which increases the effective working area of the refraction surface and the reflection surface, thereby improving the light receiving effect of the Fresnel lens.

In an embodiment, the optically reflective region is further provided with two prisms and a tail end of each prism is provided respectively with the inverted hook part.

In an embodiment, the two prisms include a first prism and a second prism that is separated from the first prism. In addition, a second angle, which is opposite to the first angle, is disposed between the reflection surface of the first prism and the refraction surface of the second prism.

In an embodiment, a lead angle portion is formed between the reflection surface of the first prism and the refraction surface of the second prism.

In an embodiment, the radius of the lead angle portion is between 0.01 mm and 0.019 mm.

In an embodiment, the optimal radius of the lead angle portion is 0.018 mm.

In an embodiment, the Fresnel lens further includes a positioning portion that is disposed between the converging surface and the incidence surface.

In an embodiment, the positioning portion is disposed annularly between the converging surface and the incidence surface.

In an embodiment, the positioning portion is disposed annularly outside the Fresnel lens.

In an embodiment, the Fresnel lens is formed integrally by injection molding to silica gel.

The present invention provides a Fresnel lens with a light receiving effect and is provided with following advantages in comparison with the prior art.

The Fresnel lens of the present invention is made of silica gel. Therefore, the inverted hook part is formed on the tail end of the prism to increase the effective working area of the refraction surface and the reflection surface, thereby providing a better light receiving effect to the optically reflective region.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
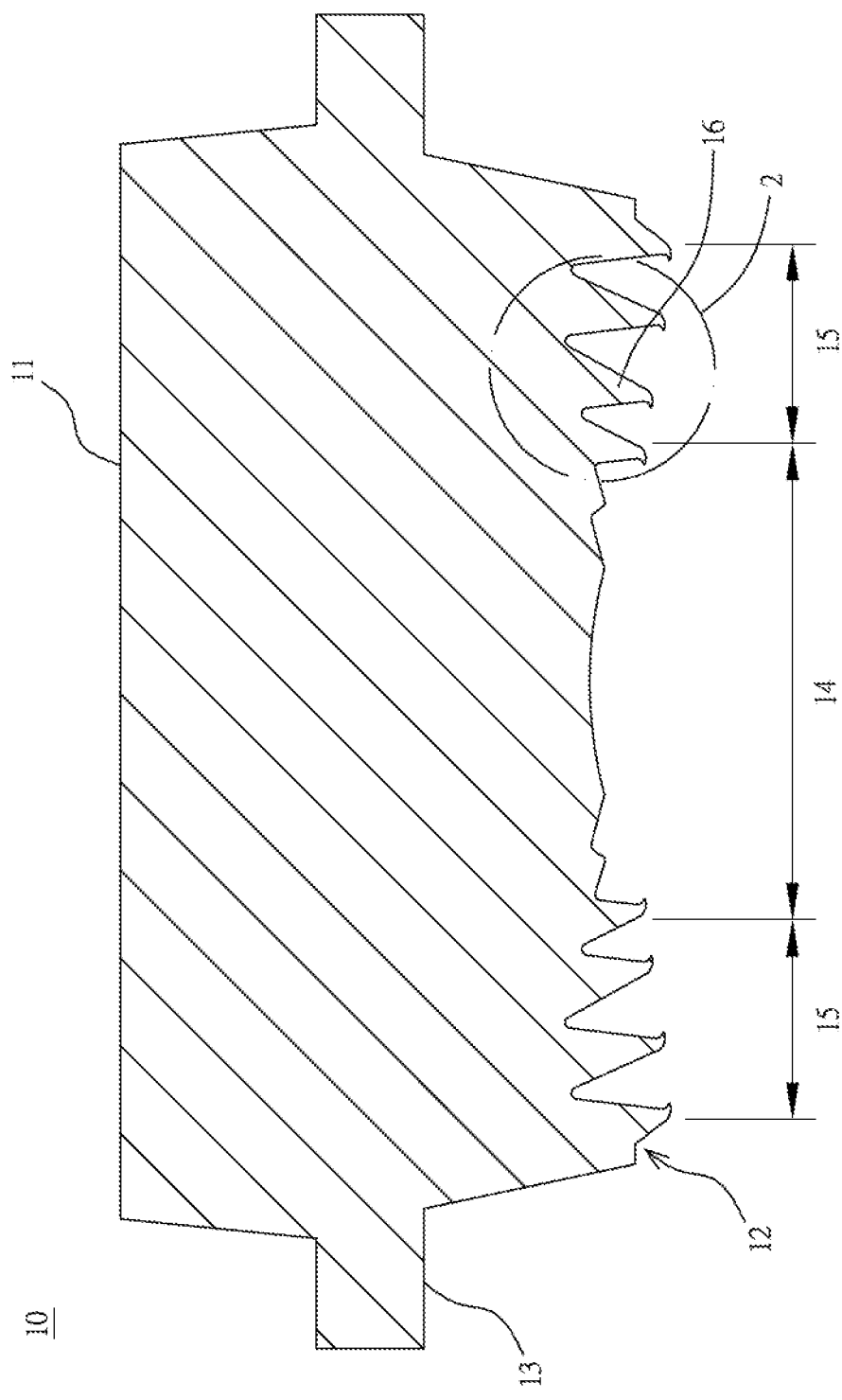
FIG. 1 shows a cutaway view of a Fresnel lens, according to the present invention.
Figure 2:
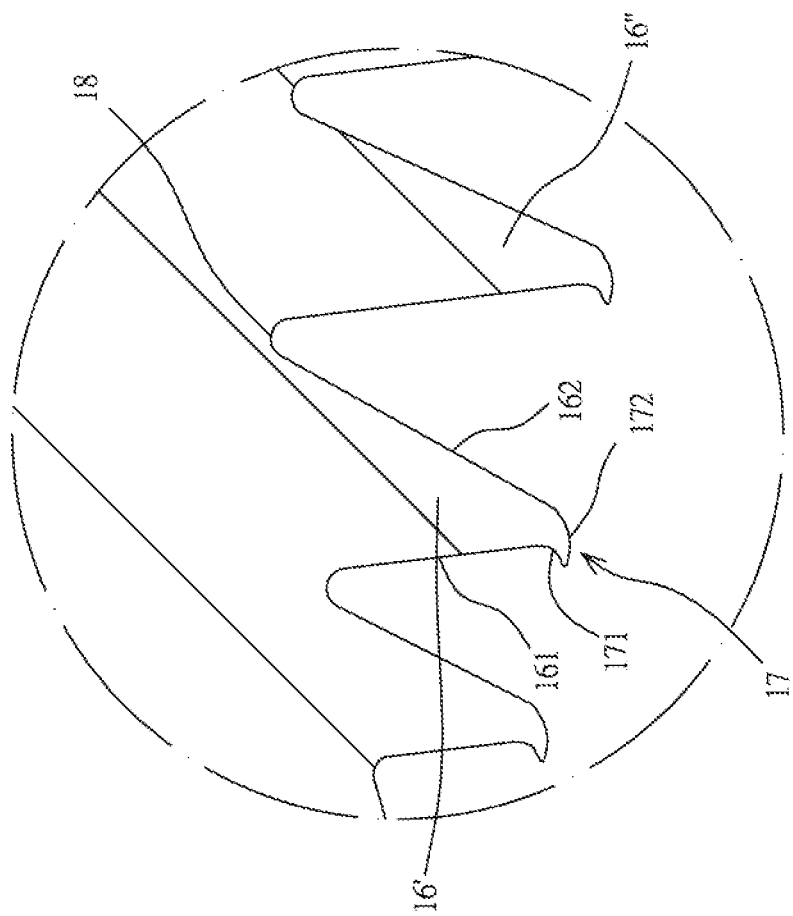
FIG. 2 shows a local blowup view of FIG. 1.

Referring to FIG. 1 and FIG. 2, the present invention discloses a Fresnel lens with a light receiving effect. In the present embodiment, a Fresnel lens 10 is formed integrally by injecting silica gel into a mold (not shown in the drawings). As silica gel itself is provided with better fluidity as compared with the abovementioned plastic material, when silica gel is injected into the mold through heating, silica gel can be filled completely into the mold, forming the Fresnel lens 10 in the present invention after silica gel is cooled down in the mold.

The Fresnel lens 10 comprises a converging surface 11, an incidence surface 12 opposite to the converging surface 11, and a positioning portion 13 that is annularly disposed between the converging surface 11 and the incidence surface 12. The incidence surface 12 is provided with an optically effective refractive region 14 and an optically reflective region 15 annularly surrounding the optically effective refractive region 14. The optically reflective region 15 is provided at least with a prism 16 that is annularly disposed outside the optically effective refractive region 14. The prism 16 is provided with a refraction surface 161 and a reflection surface 162 that is disposed at a first angle θ1 relative to the refraction surface 161. A tail end of the refraction surface 161 and the reflection surface 162 is provided with an inverted hook part 17 connecting the refraction surface 161 and the reflection surface 162. The inverted hook part 17 includes a first bending section 171 that is extended from the refraction surface 161 toward the optically effective refractive region 14, and a second bending section 172 that is extended from the reflection surface 162 toward the optically effective refractive region 14. The first bending section 171 is interconnected with the second bending section 172, forming the inverted hook part 17 on a tail end of the prism 16 using the first bending section 171 and the second bending section 172. Therefore, the effective working area of the refraction surface 161 and the reflection surface 162 can be increased through the first bending section 171 and the second bending section 172. The positioning portion 13 is disposed annularly between the converging surface 11 and the incidence surface 12, and is convexly disposed outside the Fresnel lens 10.

In the present embodiment, the optically reflective region 15 is provided with two prisms 16 as a primary implementation type, wherein the two prisms 16 includes a first prism 16' and a second prism 16" in adjacent to the first prism 16'. The first prism 16' and the second prism 16" are composed of the refraction surface 161, the reflection surface 162 and the inverted hook part 17. The first prism 16' surrounds the optically effective refractive region 14, and the second prism 16" surrounds the first prism 16'. In addition, the reflection surface 162 on the first prism 16' is interconnected with the refraction surface 161 on the second prism 16"; whereas, a second angle is formed between the reflection surface 162 of the first prism 16' and the refraction surface 161 of the second prism 16", opposite to the first angle. On the other hand, a lead angle portion 18 is formed between the reflection surface 162 of the first prism 16' and the refraction surface 161 of the second prism 16".

For the Fresnel lens 10 in the present invention, as silica gel with better fluidity is injected into the mold, when silica gel is contracted in the mold through cooling, radius between 0.01 mm and 0.019 mm will be formed to the lead angle portion 18. In the present embodiment, the optimal radius of the lead angle portion 18 is 0.018 mm after an actual test.

Accordingly, in addition to that the tail end on the prism 16 is formed with the inverted hook part 17 to increase the effective working area of the refraction surface 161 and the reflection surface 162, the effective working area of the refraction surface 161 and the reflection surface 162 can be also increased by reducing the radius of the lead angle portion 18.

Figure 3:
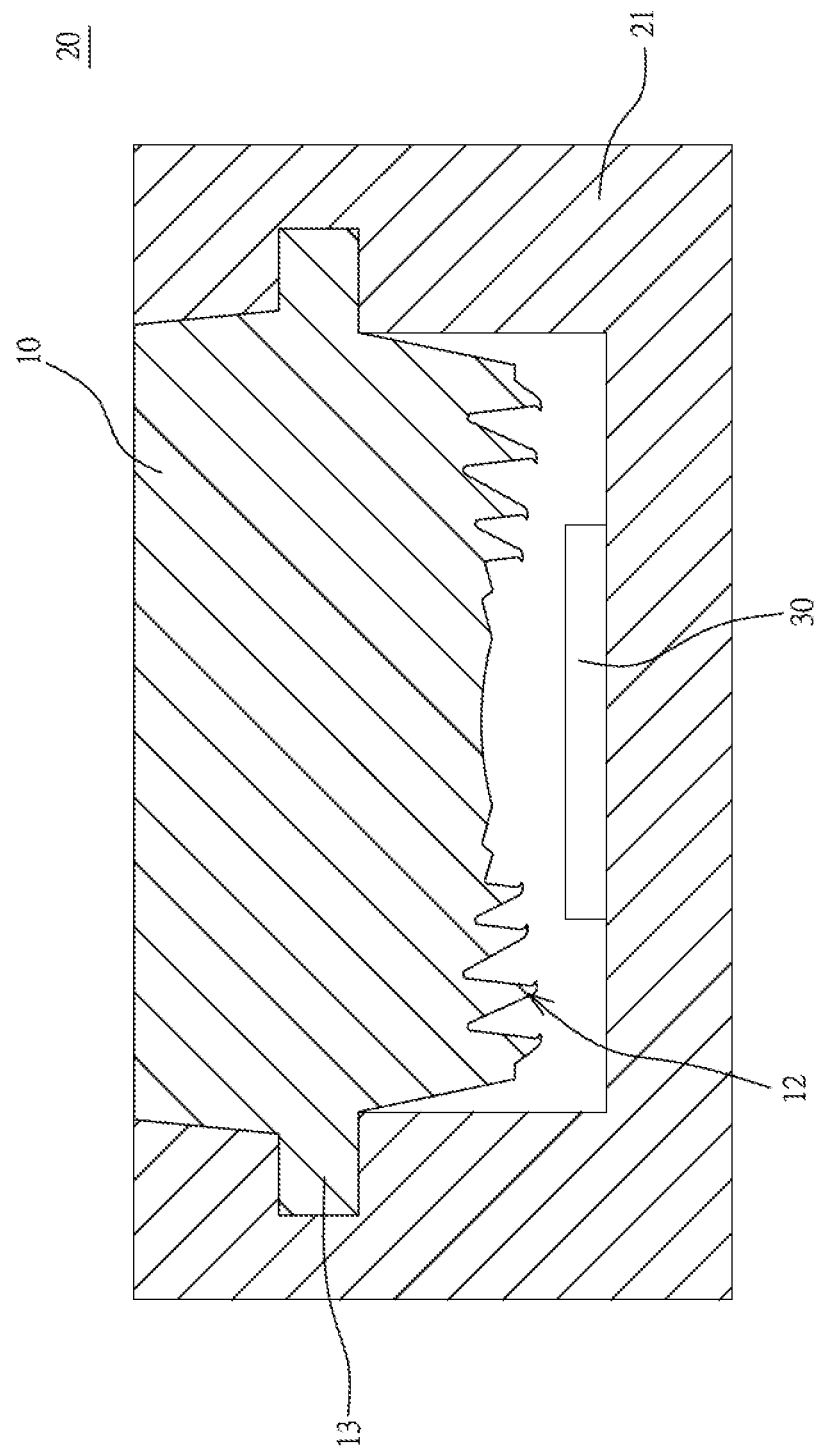
FIG. 3 shows a cutaway view of the present invention being applied on a flashlight.

Moreover, as shown in FIGS. 1 to 3, when the Fresnel lens 10 of the present invention is applied on a flashlight 20, the Fresnel lens 10 is fixed on a casing 21 primarily by the annular-shaped positioning portion 13 and is disposed on a light emitting unit 30, so that the incidence surface 12 is opposite to the light emitting unit 30. When the light emitting unit 30 projects a beam of light, the light beam passing through the optically effective refractive region 14 will directly pass through the Fresnel lens 10 and project outward from the converging surface 11. On the other hand, the light beam that passes through the optically reflective region 15 will pass through the refraction surface 161, projecting onto the reflection surface 162 after being refracted. Finally, the light beam will be projected outward from the converging surface 11 by reflection through the reflection surface 162.

Accordingly, in the present invention, by forming the inverted hook part 17 at the tail end of the prism 16 and reducing the radius of the lead angle portion 18 between the two prisms 16, the effective working area of the refraction surface 161 and the reflection surface 162 of each prism 16 is increased, so that by the Fresnel lens 10, more light beams projected from the light emitting unit 30 are able to pass through, allowing the optically reflective region 15 to achieve a more effective light receiving effect, which in turn increases the range of irradiation after the light beams are projected outward from the converging surface 11, so as to improve the operational efficiency of the flashlight.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A Fresnel lens with a light receiving effect, comprising:
a converging surface; and
an incidence surface opposite to the converging surface, the incidence surface comprising:
an optically effective refractive region; and
an optically reflective region annularly surrounding the optically effective refractive region, the optically reflective region comprising a prism annularly disposed outside the optically effective refractive region, the prism comprising:
a refraction surface adjacent to the optically effective refractive region, and
a reflection surface disposed at a first angle relative to the refraction surface, the refraction surface comprising:
a first bending section extending toward the optically effective refractive region; and
a second bending section extending toward the optically effective refractive region, the first bending section being interconnected with the second bending section to form an inverted hook part on a tail end of the prism, which increases an effective working area of the refraction surface and the reflection surface, the inverted hook part being crooked and extending toward a central direction of the Fresnel lens.

2. The Fresnel lens with a light receiving effect, according to claim 1, wherein the optically reflective region is further provided with two prisms, and a tail end of each prism is provided respectively with the inverted hook part.

3. The Fresnel lens with a light receiving effect, according to claim 2, wherein the two prisms include a first prism and a second prism which is separated from the first prism, with that a second angle is formed between the reflection surface of the first prism and the refraction surface of the second prism, opposite to the first angle.

4. The Fresnel lens with a light receiving effect, according to claim 3, wherein a lead angle portion is formed between the reflection surface of the first prism and the refraction surface of the second prism.

5. The Fresnel lens with a light receiving effect, according to claim 4, wherein the radius of the lead angle portion is between 0.01 mm and 0.019 mm.

6. The Fresnel lens with a light receiving effect, according to claim 5, wherein the optimal radius of the lead angle portion is 0.018 mm.

7. The Fresnel lens with a light receiving effect, according to claim 1, wherein the Fresnel lens is further provided with a positioning portion that is disposed between the converging surface and the incidence surface.

8. The Fresnel lens with a light receiving effect, according to claim 7, wherein the positioning portion is annularly disposed between the converging surface and the incidence surface.

9. The Fresnel lens with a light receiving effect, according to claim 8, wherein the positioning portion is annularly disposed outside the Fresnel lens.

10. The Fresnel lens with a light receiving effect, according to claim 1, wherein the Fresnel lens is formed integrally by injection molding to silica gel.

* * * * *